(12) United States Patent
Oguri (10) Patent No.: US 11,568,112 B2
(45) Date of Patent: Jan. 31, 2023

(54) SYSTEM DESIGN SUPPORT APPARATUS AND SYSTEM DESIGN SUPPORT METHOD

(71) Applicant: Mitsubishi Electric Corporation, Tokyo (JP)

(72) Inventor: Yurika Oguri, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 868 days.

(21) Appl. No.: 16/345,726

(22) PCT Filed: Mar. 30, 2017

(86) PCT No.: PCT/JP2017/013228
§ 371 (c)(1),
(2) Date: Apr. 29, 2019

(87) PCT Pub. No.: WO2018/179206
PCT Pub. Date: Oct. 4, 2018

(65) Prior Publication Data
US 2020/0050709 A1    Feb. 13, 2020

(51) Int. Cl.
*G06F 30/31* (2020.01)
*G06F 30/00* (2020.01)
(Continued)

(52) U.S. Cl.
CPC ..... *G06F 30/31* (2020.01); *G01R 31/318314* (2013.01); *G05B 19/058* (2013.01);
(Continued)

(58) Field of Classification Search
CPC ....................................................... G06F 30/31
(Continued)

(56) References Cited

U.S. PATENT DOCUMENTS

2003/0045950 A1 * 3/2003 Bronikowski ............ G06F 8/20
700/86

FOREIGN PATENT DOCUMENTS

JP    5-265740 A    10/1993
JP    8-320782 A    12/1996
(Continued)

OTHER PUBLICATIONS

International Search Report and Written Opinion dated Jun. 27, 2017 for PCT/JP2017/013228 filed on Mar. 30, 2017, 13 pages including English translation.
(Continued)

*Primary Examiner* — Eric D Lee
(74) *Attorney, Agent, or Firm* — Xsensus LLP (57) ABSTRACT

A system design support apparatus generates new user data on the basis of derived user data including: base user data reference information that is information specifying user data to be referred to; and information on an item changed from the user data specified by the base user data reference information and on changed contents. A system design support method includes a step of selecting user data to be used, a step of generating derived user data including: base user data reference information for specifying the selected user data to be used; and information on an item changed from the user data specified by the base user data reference information and on changed contents, and a step of generating new user data on the basis of the derived user data.

13 Claims, 7 Drawing Sheets

(51) Int. Cl.
    *G05B 19/05*     (2006.01)
    *G05B 19/418*     (2006.01)
    *G06F 30/34*     (2020.01)
    *G01R 31/3183*     (2006.01)
    *G06F 9/455*     (2018.01)
    *G06F 111/20*     (2020.01)
    *G06F 115/02*     (2020.01)

(52) U.S. Cl.
    CPC ....... *G05B 19/41845* (2013.01); *G06F 9/455* (2013.01); *G06F 30/00* (2020.01); *G06F 30/34* (2020.01); *G05B 19/056* (2013.01); *G06F 2111/20* (2020.01); *G06F 2115/02* (2020.01)

(58) Field of Classification Search
    USPC .......................................................... 716/139
    See application file for complete search history.

(56) References Cited

FOREIGN PATENT DOCUMENTS

| | | |
|---|---|---|
| JP | 10-69379 A | 3/1998 |
| JP | 2001-51704 A | 2/2001 |
| JP | 2004-258863 A | 9/2004 |
| JP | 2005-38261 A | 2/2005 |
| JP | 2008-282362 A | 11/2008 |
| JP | 2014-238820 A | 12/2014 |

OTHER PUBLICATIONS

Notification of Reasons for Refusal received for Japanese Patent Application No. 2018-563634, dated Mar. 19, 2019, 8 pages including English translation.

Chinese Office Action with a partial English translation dated Oct. 12, 2022, in corresponding Chinese Patent Application No. 201780080240.9.

* cited by examiner

SYSTEM DESIGN SUPPORT APPARATUS AND SYSTEM DESIGN SUPPORT METHOD

CROSS-REFERENCE TO RELATED APPLICATIONS

The present application is based on PCT filing PCT/JP2017/013228 filed Mar. 30, 2017, the entire contents of which are incorporated herein by reference.

FIELD

The present invention relates to a system design support apparatus and a system design support method suitable to construct a system similar to an existing system.

BACKGROUND

A programmable logic controller (hereinafter referred to as a PLC) has been used as a control device for industrial machines and the like. The PLC is composed of a base unit and a plurality of units disposed on the base unit. For example, the PLC is made up of various types of units combined suitably as needed such as a power supply unit that supplies electric power to the entire PLC, a CPU unit that manages the control of the entire PLC, a motion unit that controls a servo motor mounted to a drive unit of production equipment or facility equipment via a servo amplifier, an input unit that receives signals from a switch or a sensor mounted in an appropriate place of the production equipment or the facility equipment, an output unit that outputs control output to an actuator or the like, and a communication unit for connecting the PLC to a communication network.

To construct a system using a control device such as a PLC, a system design support apparatus provided outside the PLC has conventionally been used to edit user data such as programs and parameters and write the edited user data to each control device (Patent Literature 1). To newly construct a system similar to an existing system, user data created in the past has been copied once and then corrected suitably for use.

CITATION LIST

Patent Literature

Patent Literature 1: Japanese Patent Application Laid-open No. 2008-282362

SUMMARY

Technical Problem

When constructing a similar device and line, the conventional system design support apparatus copies and customizes all user data created by a user such as system configuration diagram information, control programs, and parameters on workspaces. Consequently, each time a similar device and line is constructed, similar user data is created, resulting in user data to be managed being increased and thus difficult to manage and maintain. When a defect requiring correction such as a bug in a program is found in user data, it is required to determine the presence or absence of devices that have copied and used the user data. For all devices found to have used the user data, it is necessary to verify the used status of correction-requiring data of the user data and determine whether or not the correction is necessary. For this reason, the system designer should bear a greater burden.

Solution to Problem

To achieve the above object, a system design support apparatus according to the present invention generates a new user data is generated on a basis of derived user data, the derived user data including: base user data reference information that is information specifying user data to be referred to; and information on an item changed from the user data specified by the base user data reference information and on changed contents.

Also, to achieve the above object, a system design support method according to the present invention comprises: a step of selecting user data to be used; a step of generating derived user data, the derived user data including: base user data reference information for specifying the selected user data to be used; and information on an item changed from the user data specified by the base user data reference information and on changed contents; and a step of generating the new user data on a basis of the derived user data.

Advantageous Effects of Invention

The present invention facilitates management and maintenance of user data when existing user data is used, and can reduce the burden on the system designer.

DESCRIPTION OF EMBODIMENT

Hereinafter, an embodiment of a system design support apparatus according to the present invention will be described in detail with reference to the drawings. In the present embodiment, the system design support apparatus is used for designing and managing a system configuration to construct an FA system including a PLC system, a motion system, and a display system. Note that the embodiment is not intended to limit the invention.

Embodiment

Figure 1:
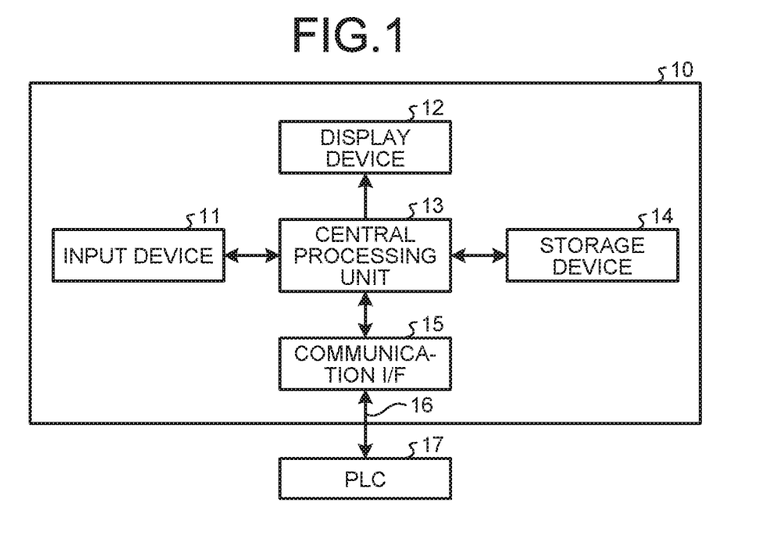
FIG. 1 is a block diagram illustrating the hardware configuration of a system design support apparatus according to an embodiment of the present invention.

FIG. 1 is a block diagram illustrating the overall hardware configuration of a system design support apparatus 10 according to an embodiment of the present invention.

The system design support apparatus 10 is connected via a communication line 16 to a PLC 17 to be managed. The present embodiment describes the case where an object to be managed is a PLC. In addition to the case where an object to be managed is a PLC, the present invention is applicable to not only equipment for a production system including a display, an actuator, a sensor, and a controller of a robot or the like connected via a PLC or a network (FA equipment) but also equipment for a plant management system and equipment for a building management system.

The system design support apparatus 10 is a personal computer, for example, and includes an input device 11 composed of a keyboard and a pointing device or the like, a display device 12, a central processing unit 13, a storage device 14, and a communication interface (I/F) 15. The communication I/F 15 performs processing for communication between the system design support apparatus 10 and the PLC 17 via the communication line 16. Although not illustrated, the storage device 14 includes a nonvolatile storage device and a volatile storage device. The nonvolatile storage device stores user data. The volatile storage device is used as work memory at runtime of the central processing unit 13.

Figure 2:
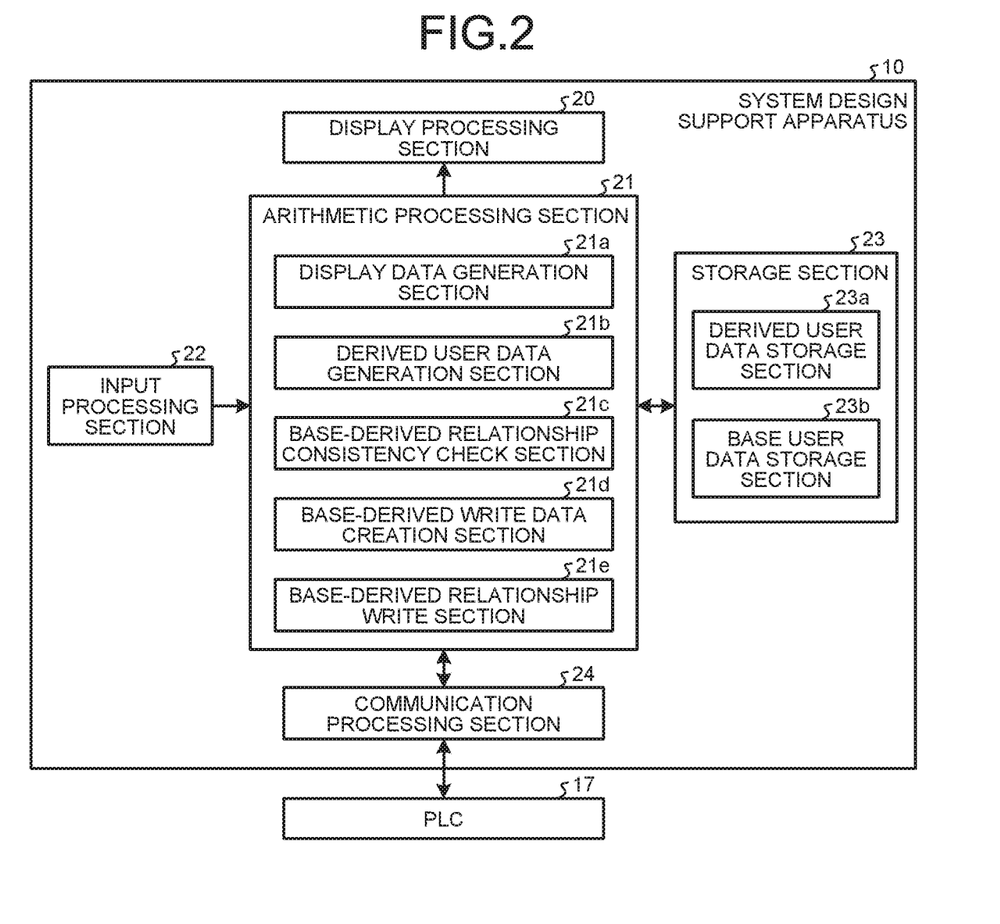
FIG. 2 is a functional block diagram of the system design support apparatus according to the embodiment of the present invention.

FIG. 2 is a functional block diagram of the system design support apparatus 10 according to the embodiment of the present invention implemented by using the central processing unit 13 and the storage device 14 in FIG. 1. The system design support apparatus 10 includes an input processing section 22 that processes input from the input device 11, a display processing section 20 that outputs display data to the display device 12, an arithmetic processing section 21, a storage section 23 that stores results of calculation by the arithmetic processing section 21 and user data (data including system configurations, programs, and parameters), and a communication processing section 24 that processes communication with the PLC 17. The arithmetic processing section 21 includes a display data generation section 21a that generates display data, a derived user data generation section 21b, a base-derived relationship consistency check section 21c, a base-derived write data creation section 21d, and a base-derived relationship write section 21e. The storage section 23 includes a derived user data storage section 23a and a base user data storage section 23b.

When the derived user data generation section 21b uses and edits existing user data to generate new user data, the derived user data generation section 21b creates derived user data 30 including information for specifying this existing or source user data as base user data 35, and information on changes from the user data. User data to be used is selected by an operation of the user.

The derived user data storage section 23a stores derived user data created by the derived user data generation section 21b. The base user data storage section 23b stores base user data. The base user data, which is existing user data, is referred to by the derived user data generation section 21b.

The display data generation section 21a creates display data for checking the relationship between base user data and derived user data by using class diagrams or the like. Visually representing the relationship between user data using class diagrams or the like facilitates identifying edited portions.

The base-derived relationship consistency check section 21c checks the presence or absence of inconsistent data in user data stored in the derived user data storage section 23a and the base user data storage section 23b in the storage section 23. For example, the base-derived relationship consistency check section 21c determines, on the basis of user data detailed information, whether or not there is duplication of IP addresses, station numbers, etc. for all user data having the same user data detailed information on the network configuration (user data present in the same network) in the user data stored in the derived user data storage section 23a and the base user data storage section 23b in the storage section 23. When duplication exists, the display processing section 20 is caused to output an error. It is noted that the target to be checked for consistency is not limited to the presence or absence of duplication of IP addresses, station numbers, etc. Check items and determination criteria can be added and changed by the user as desired.

The base-derived write data creation section 21d converts base user data and derived user data into binary data to be written to the PLC 17.

The base-derived relationship write section 21e writes to the PLC 17 the binary data created by the base-derived write data creation section 21d.

The input processing section 22 analyzes an text input by GUI of the pointing device or by the keyboard of the input device 11, which is input according to the display data pieces described above displayed on the display screen of the display processing 12 and data displayed at display portions. The input processing section 22 transmits the analyzed input to the functional units of the arithmetic section 21.

Figure 3:
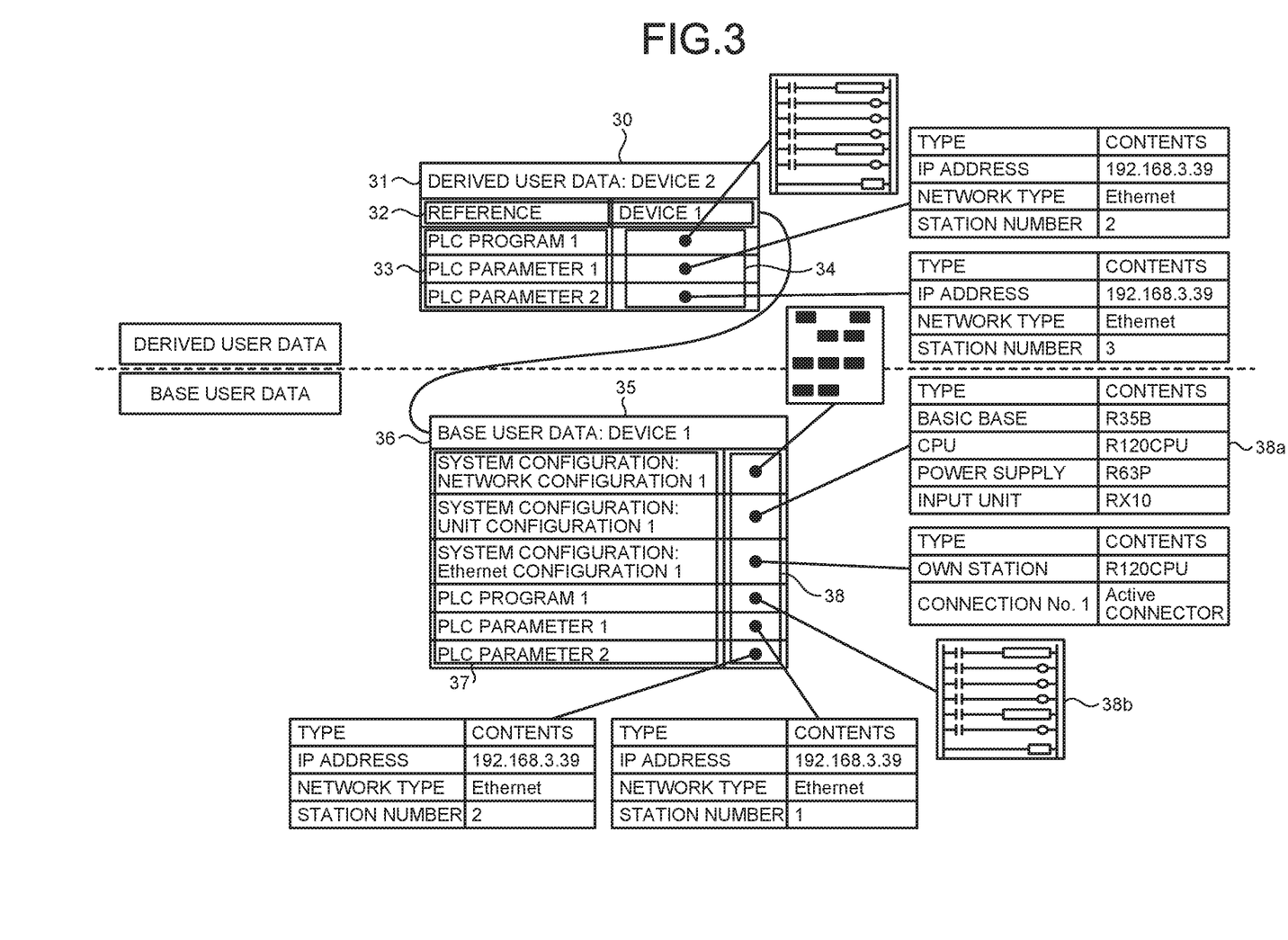
FIG. 3 is a diagram illustrating an example of user data created according to the embodiment of the present invention.

FIG. 3 is an example of base user data and derived user data created by a derived user data generation unit. The base user data 35 is configured to include a base name 36, base user data names 37, and base user data detailed information 38 linked to and holding detailed information on the base user data names 37. In the base user data names 37, names of system configuration information on workspaces or projects, program information, parameter information, etc. created by the user are stored.

When a source device (a device 1) is configured to have system configurations (a network configuration 1, a unit configuration 1, and an Ethernet (registered trademark) configuration 1), a program (a PLC program 1), and parameters (a PLC parameter 1 and a PLC parameter 2), the name of the source device "Device 1" is stored in the base name 36 of the base user data 35. Also, device configuration names including "PLC Program 1" are stored in the base user data names 37. Further, link information that allows viewing and editing of contents of the workspaces or projects corresponding to the base user data names 37 is stored in the base user data detailed information 38. Following the link information enables checking and editing, for example, information on a ladder program 38b from the base user data detailed information 38 corresponding to "PLC Program 1". "Unit Configuration 1" stores the names and their contents of units selected by the user, and these names and contents are listed as types and contents such as data on a unit configuration 38a. Other data stores data in the same structure.

The derived user data 30 is configured to include a derived name 31, derived user data names 33, derived user data detailed information 34, and base user data reference information 32. The derived user data detailed information 34 is linked to and holds detailed information on the derived user data names 33. The base user data reference information 32 holds information on the base user data 35 referred to by the derived user data 30. The base user data reference information 32 may hold a plurality of pieces of base user data 35. Further, a plurality of pieces of derived user data 30 may refer to one piece of base user data 35. The derived user data names 33 and the derived user data detailed information 34 of the derived user data 30 include only information on changes from the base user data 35. Change information includes additions of and changes to user data. The addition of user data means a state in which user data not held in the base user data 35 is newly added to the derived user data 30. The change to data means a state in which the same name exists in the derived user data names 33 and the base user data names 37, and a change is made to the base user data detailed information 38.

When changes are made to a program (PLC program 1) and parameters (PLC parameter 1 and PLC parameter 2) in using the user data on the device 1 for use in a device 2, information of "Device 2" is stored in the derived name 31 of the derived user data 30, and "Device 1" representing the source is stored in the base user data reference information 32. Also, "PLC Program 1", "PLC Parameter 1", and "PLC Parameter 2" to which changes have been made are stored in the derived user data names 33. Further, link information that allows viewing and editing of the contents of the workspaces or the projects corresponding to the derived user data names 33 is stored in the derived user data detailed information 34. Following the link information enables checking and editing information on the ladder program 38b of the changed PLC program 1 and the contents of the changed PLC parameter 1 and the changed PLC parameter 2. The information on the derived user data 30 and the base user data 35 is an example, and the present invention is not limited to this.

The present embodiment has been described on the assumption that the name of the source device is used as the base user data reference information 32. The base user data reference information 32 can be any information that can specify the source device such as a unique number or an address representing the source device.

The relationship between the base user data 35 and the derived user data 30 can be built by the base user data reference information 32, so that the derived user data 30 created to be written to the PLC 17 by a base-derived write unit includes: the user data of the network configuration, the unit configuration, and the Ethernet (registered trademark) configuration of the base user data 35 as system configurations; and the user data of the PLC program 1 (a ladder program is added to the derived user data 30), the PLC parameter 1 (the station number of the derived user data 30 is changed from 1 to 2), and the PLC parameter 2 (the station number of the derived user data 30 is changed from 2 to 3) stored in the derived user data 30.

Figure 4:
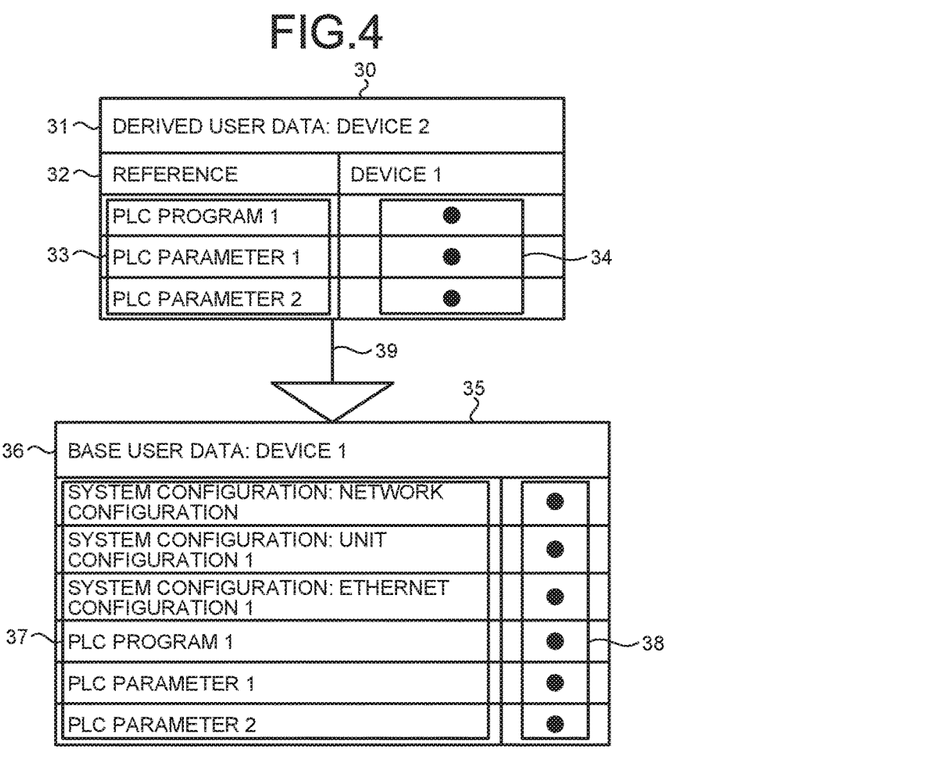
FIG. 4 is a diagram illustrating an example of a display screen of data created according to the embodiment of the present invention.

FIG. 4 is an example of display data generated by a base-derived relationship display means. On the basis of the information of the base user data 35 and the derived user data 30 created by the derived user data generation unit, the relationship between the base user data 35 and the derived user data 30 is represented by a reference status indication symbol 39. The contents of the user data are the same as the contents in FIG. 3.

Figure 5:
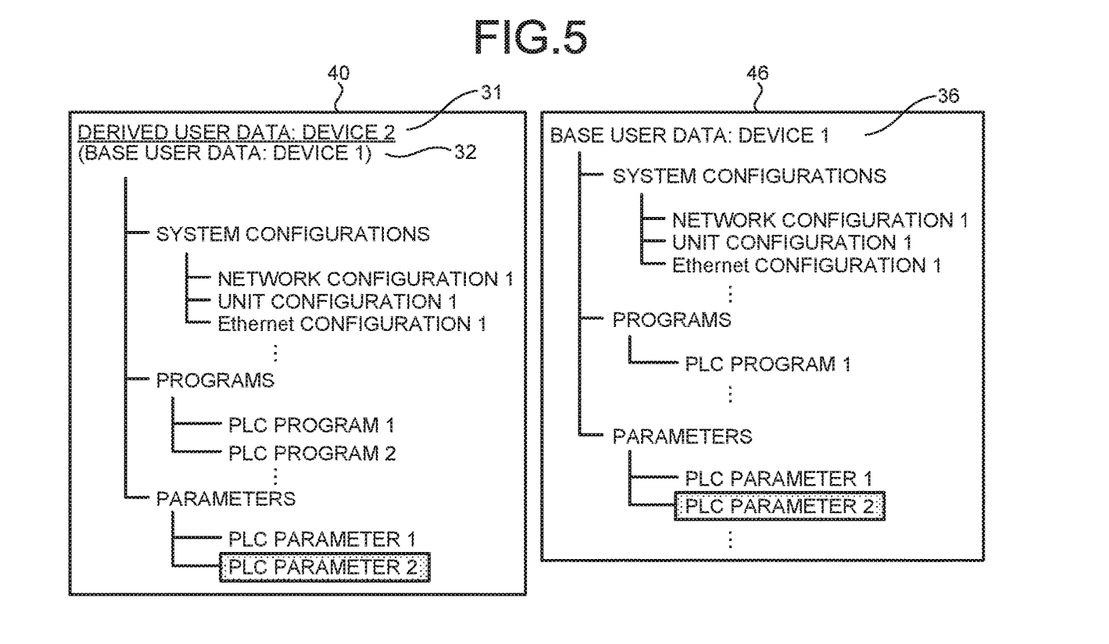
FIG. 5 is a diagram illustrating an example of an editing screen displayed according to the embodiment of the present invention.

FIG. 5 illustrates an example of data generated by an edited data check means and displayed by the display processing section 20. This is a screen created and displayed when the user creates a base-derived relationship by using the derived user data generation means on the system design support tool 10. On a base user data editing screen 46, the base user data is displayed by the derived user data generation means. On the base user data editing screen 46, a class diagram is displayed which illustrates the base user data in a hierarchical structure, in which "Device 1" of the base name 36 is in the first level; large categories including "System Configurations", "Programs", and "Parameters" are in the second level; and the names of the projects corresponding to each of the large categories are in the third level. On a derived user data editing screen 40, a class diagram is displayed which illustrates the derived user data in a hierarchical structure, in which "Device 2" of the derived name 31 and "Device 1" of the base user data reference information 42 are in the first level, large categories including "System Configurations", "Programs", and "Parameters" are in the second level, and the names of the projects corresponding to each of the large categories are in the third level. The names of the respective projects are linked to their corresponding editing screens. Thus, at the time of editing, double-clicking the names of the projects opens the editing screens to thereby allow editing and viewing. On the derived user data editing screen 40, not only the derived user data 30 but also the base user data 35 of the use source are displayed. On the derived user data editing screen 40, the base user data 35 and the derived user data 30 coexist. Thus, portions using the base user data 35 are indicated by blue slanting bold letters, and the derived user data 30 are indicated by red letters. At the point in time when the base user data 35 is edited, the project having the same name as the base user data 35 is changed from blue slanting bold letters to red letters. When new user data is added to the base user data 35, the added user data is indicated by red letters. Likewise, the base user data editing screen 46 is displayed with blue slanting bold letters. This way of displaying the user data is an example. The present invention is not limited to this, and can use any distinguishable expression.

A display example in which the system configurations of the device 2 are used, a program is added and changes are made to programs, and parameters are changed will be described with reference to FIG. 5. "Device 2" is indicated by red letters in the derived name 31 on the derived user data editing screen 40; "Network Configuration 1", "Unit Configuration 1", "Ethernet (registered trademark) Configuration 1", etc. under "System Configurations" are indicated by blue slanting bold letters; and "PLC Program 1" under "Programs", which is user data created by changing the base user data of the device 1, is indicated by red letters. "PLC Program 2" newly added to the device 1 is also indicated by red letters; and "PLC Parameter 1" and "PLC Parameter 2" under "Parameters", which are user data created by changing the base user data, are indicated by red letters.

When there is a problem with the base user data 35 and the base user data detailed information 38 is corrected, the derived user data 30 influenced by the correction to the base user data detailed information 38 is extracted using: the base user data name 37 of the base user data 35 of the corrected base user data detailed information 38; and the base user data reference information 32 in the derived user data storage section 23a. When the derived user data names 33 of the extracted derived user data include one matching the base user data name 37 corresponding to the corrected base user data detailed information 38, the change in the base user data 35 is indicated identifiably on the derived user data editing screen 40 (for example, in yellow letter color, enclosed by a rectangle) without changing the derived user data detailed information 34. When there is no match, the indication is kept in blue slanting bold letters but the change in the base user data 35 is identifiably indicated (for example, enclosed by a rectangle) because the derived user data 30 refers to the corrected base user data 35. This facilitates identification of a device influenced by the correction to user data, and facilitates the determination of whether or not it is necessary to correct user data already written to a device.

Figure 6:
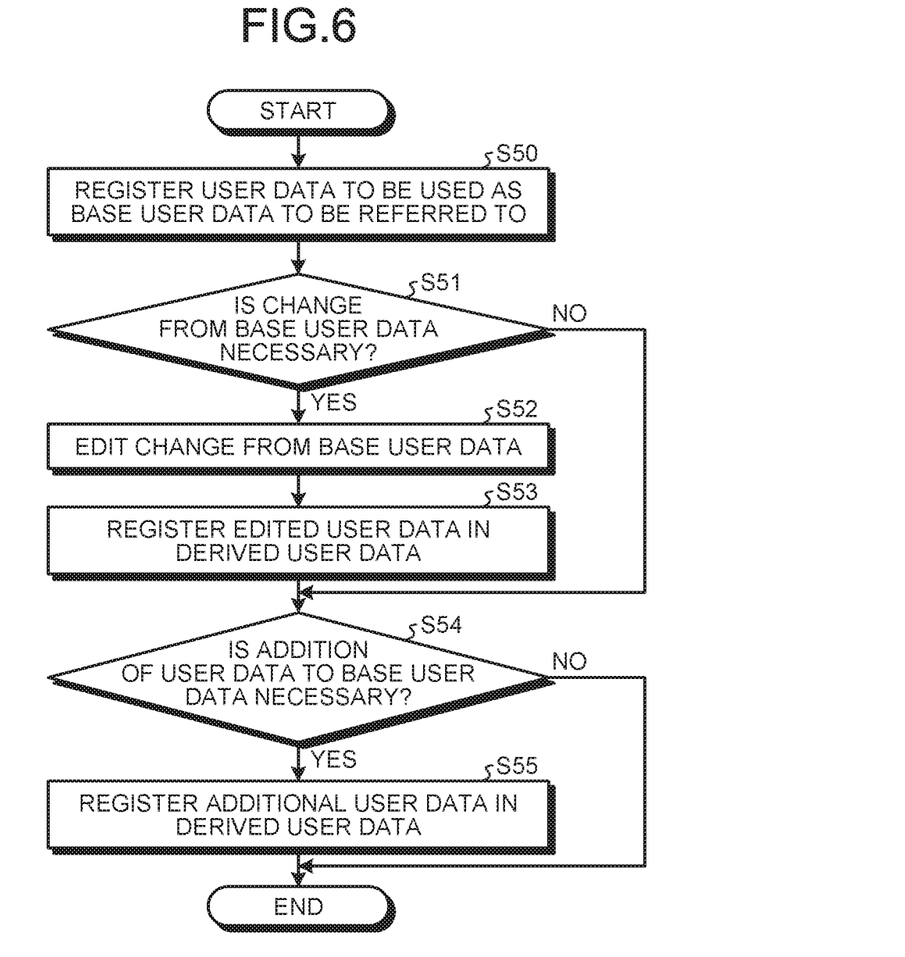
FIG. 6 is a flowchart illustrating the operation of a derived user data generation section according to the embodiment of the present invention.

Hereinafter, the operation process by the system design support apparatus 10 in the embodiment of the present invention will be described. The operation of the derived user data generation section 21b for creating the base user data 35 and the derived user data 30 will be described. FIG. 6 is a flowchart illustrating the operation. When the user creates a similar device, using user data, the user selects source user data, using the pointing device or the like of the input device 11. The selected user data is registered as base user data, and information such as the name or address of the base user data is stored in the derived user data storage section 23a, as the base user data reference information 32 of the derived user data 30. Also, the source user data selected is stored in the base user data storage section 23b, as the base user data 35 (S50). Next, it is determined whether or not it is necessary to change user data from the base user data 35 (S51). When such a change is needed, the user uses the derived user data editing screen 40 to thereby edit user data that the user wants to change (S52). Since only the user data changed from the base user data 35 is registered in the derived user data 30, the derived user data 30 having only the change can be created (S53). Since the derived user data 30 is copied from the base user data 35 and then edited, the content of the base user data 35 is not changed. On the other hand, when no change is needed in the base user data, steps in S52 and S53 are skipped. Next, it is determined whether or not it is necessary to add user data to the base user data 35 (S54). When there is user data to be added, the user can store the additional user data in the derived user data 30 by newly adding the user data to a user data list on the derived user data editing screen 40 (S55). On the other hand, when no user data needs to be added, the step in S55 is skipped. When exactly the same user data is used without changes and additions from and to the base user data, the derived user data 30 holds only the base user data reference information 32.

The derived user data generation section 21b registers, in the derived user data 30, the relationship between the created derived user data 30 and the base user data, as the base user data reference information 32. The base user data reference information 32 is information for specifying the source user data, and can be any capable of specifying the source, including the name or the address information of the source device. When the base user data 35 is referred to from the derived user data 30, the base user data 35 to be referred to can be identified from the base user data reference information 32.

Thus, the operation of the derived user data generation section 21b allows the user to create a similar device and line only by changing base user data or changing derived user data without copying all projects, so that reusability of programs and the like is improved. Even when a problem occurs in base user data (such as a system configuration, a control program, or a parameter), correcting only the base user data eliminates the need to correct all programs, so that man-hours can be reduced.

Figure 7:
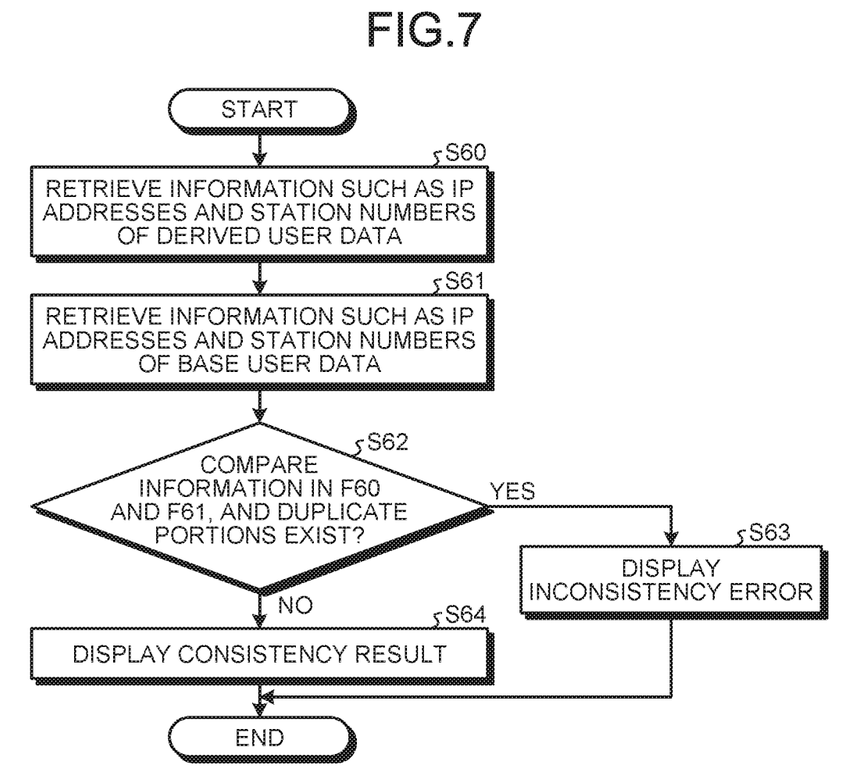
FIG. 7 is a flowchart illustrating the operation of a check section according to the embodiment of the present invention.

The operation of the base-derived relationship consistency check section 21c will be described. FIG. 7 is a flowchart illustrating the operation. When the user selects a base-derived consistency check command using the input device 11, the base-derived relationship consistency check section 21c retrieves information such as the IP addresses and the station numbers of the derived user data 30 stored in the derived user data storage section 23a of the storage section 23 (S60). Next, the base-derived relationship consistency check section 21c retrieves information such as the IP addresses and the station numbers of the base user data 35 stored in the base user data storage section 23b (S61). Next, the base-derived relationship consistency check section 21c compares information acquired from the derived user data 30 with information acquired from the base user data 35 to determine the presence or absence of duplicate portions (S62). When the duplicate portions exist, the base-derived relationship consistency check section 21c displays an inconsistency-error result on the display processing section 20 section 20 (S63). On the other hand, when no duplicate portions exist, the base-derived relationship consistency check section 21c causes the display processing section 20 to output a consistency result (S64).

For example, in consistency check, it is necessary to check duplication of IP addresses and station numbers in the same network. Error is output in all the cases: where only an IP address is duplicated; where only a station number is duplicated; and where both an IP address and a station number are duplicated.

Thus, the operation of the base-derived relationship consistency check section 21c eliminates the need for the user himself or herself to check inconsistency in user data by viewing the data, allowing a reduction in man-hours for checking operations.

Figure 8:
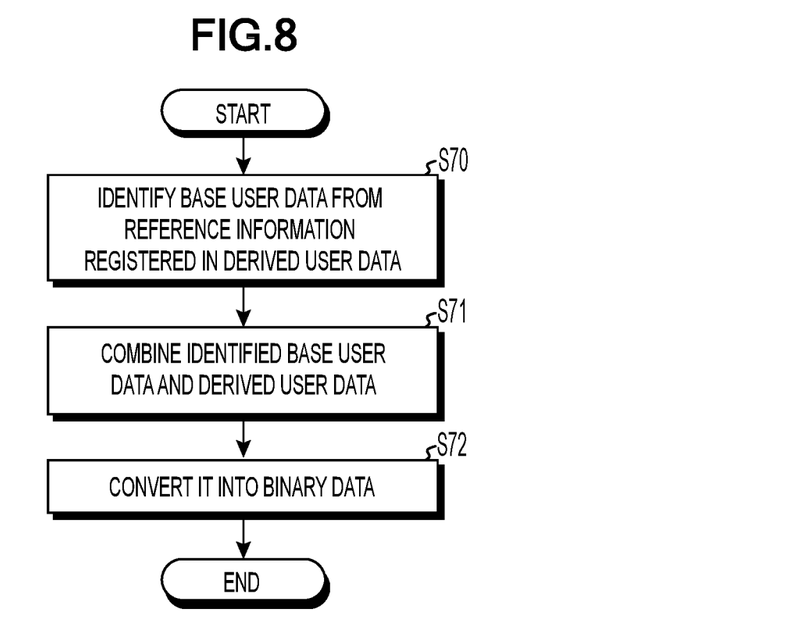
FIG. 8 is a flowchart illustrating the operation of a base-derived write data creation section according to the embodiment of the present invention.

The operation of the base-derived write data creation section 21d will be described. FIG. 8 is a flowchart illustrating the operation. When the user selects user data to be written to the PLC 17 using the input device 11, the base-derived write data creation section 21d searches the base user data storage section 23b on the basis of the base user data reference information 32 in the derived user data storage section 23a to thereby identify the base user data 35 to be referred to (S70). Next, the base-derived write data creation section 21d combines the identified base user data 35 and the derived user data 30 into one user data (S71). Next, the base-derived write data creation section 21d converts the combined data into binary data (S72), and passes the data to the base-derived relationship write section 21e. In the step of combining the base user data 35 and the derived user data 30, the following processing (1) to (3) is performed. (1) For user data that is not in the base user data names 37 but in the derived user data names 33, the derived user data 30 is used. (2) For user data that is in the base user data names 37 rather than in the derived user data names 33, the base user data 35 is used. (3) For user data of the same name included in both the derived user data names 33 and the base user data names 37, the derived user data 30 is used.

Thus, the operation of the base-derived write unit can save the user himself/herself from combining user data into one and writing the combined one data to the PLC 17. Furthermore, development can be performed efficiently while ensuring the quality of base user data, so that the development cost can be reduced.

Figure 9:
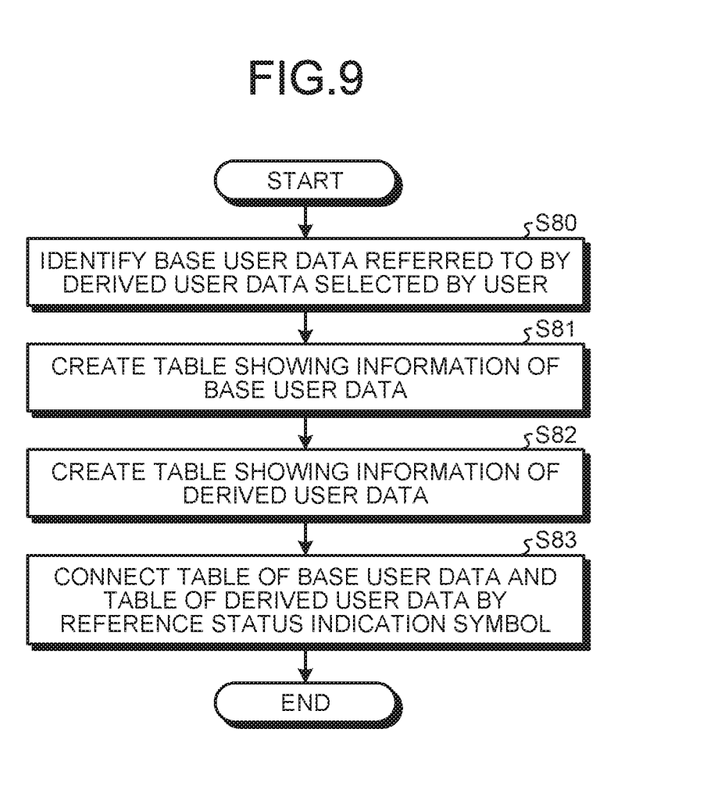
FIG. 9 is a flowchart illustrating the operation of a display data generation section according to the embodiment of the present invention.

The operation of the display data generation section 21a when displaying the relationship between the base user data 35 and the derived user data will be described. FIG. 9 is a flowchart illustrating the operation. First, when the user selects the derived user data 30 that the user wants to display, using the input device 11, the display data generation section 21a identifies the base user data 35 referred to by the derived user data 30 from the base user data reference information 32 in the derived user data 30 (S80). Next, the display data generation section 21a performs creation of a table showing information of the base user information (S81), performs creation of a table showing the derived user data (S82), and connects the table showing the base user data and the table showing the derived user data by the reference status symbol 39, thereby completing the display in FIG. 4.

Thus, the base-derived relationship display unit allows the user to easily grasp the relationship between the base user data 35 and the derived user data 30. This clarifies influence range when a problem occurs or what user data refers to when a new customized product is created, so that use development becomes efficient.

Figure 10:
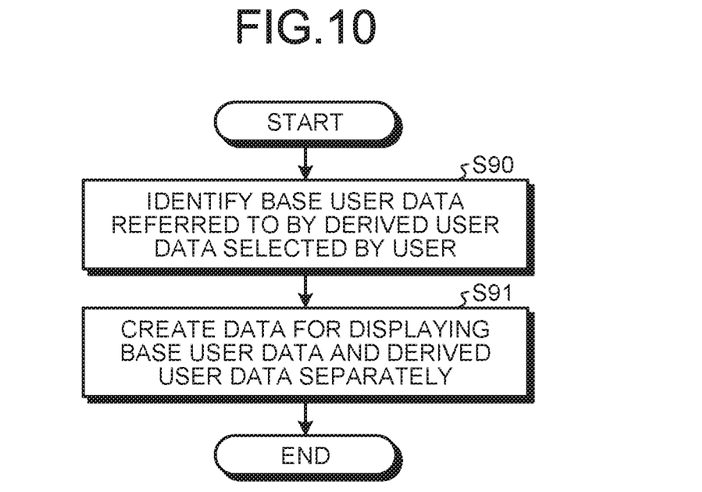
FIG. 10 is a flowchart illustrating the operation of the display data generation section according to the embodiment of the present invention.

The operation of the display data generation section 21a when displaying an edited data confirmation screen will be described. FIG. 10 is a flowchart illustrating the operation. When the user selects the edited, derived user data 30 which the user wants to confirm, using the input device 11, the display data generation section 21a extracts, from the base user data reference information 32 in the derived user data 30, the base user data 35 referred to by the user-selected derived user data (S90). Next, the display data generation section 21a creates display data in which the base user data 35 and the derived user data 30 including the base user data 35 are placed side by side and are each displayed in a hierarchical structure (S91). As a result, as illustrated in FIG. 5, a display screen in which the derived user data editing screen 40 and the base user data editing screen 46 are placed side by side is completed.

The edited data confirmation screen thus created allows the user to easily compare and confirm edited data, and can improve working efficiency.

INDUSTRIAL APPLICABILITY

As described above, the system design support apparatus according to the present invention is suitable for system design in constructing a system similar to an existing system.

REFERENCE SIGNS LIST 10 system design support apparatus; 11 input device; 12 display device; 13 central processing unit; 14 storage device; 15 communication I/F; 16 communication line; 17 PLC; 20 display processing section; 21 arithmetic processing section; 21a display data generation section; 21b derived user data generation section; 21c base-derived relationship consistency check section; 21d base-derived write data creation section; 21e base-derived relationship write section; 22 input processing section; 23 storage section; 23a derived user data storage section; 23b base user data storage section; 24 communication processing unit; 30 derived user data; 31 derived name; 32 base user data reference information; 33 derived user data name; 34 derived user data detailed information; 35 base user data; 36 base name; 37 base user data name; 38 base user data detailed information; 39 reference status indication symbol; 40 derived user data editing screen; 46 base user data editing screen.

The invention claimed is:

1. A system design support apparatus used to generate new user data, using existing user data, comprising:
   circuitry configured to generate the new user data on a basis of derived user data, the derived user data including:
      base user data reference information that is information specifying user data to be referred to; and
      information on an item changed from the user data specified by the base user data reference information and on changed contents;
   display data generator circuitry configured to generate display data for grouping and hierarchically displaying data included in the derived user data; and
   inconsistent data checking circuitry configured to check presence or absence of inconsistent data between the derived user data and the user data specified by the base user data reference information,
   wherein the inconsistent data checking circuitry checks the presence or absence of the inconsistent data by determining whether duplicate portions of the derived user data and the specified user data exist, and the inconsistent data checking circuitry displays an inconsistency-error result when the duplicate portions exist, and
   wherein in the hierarchical display of the data, an item in which the user data specified by the base user data reference information is used as it is, and an item in which the user data specified by the base user data reference information is changed in the derived user data are visually distinctively displayed.

2. The system design support apparatus according to claim 1, wherein the new user data is generated by combining the derived user data and the user data specified by the base user data reference information.

3. The system design support apparatus according to claim 2, wherein the user data specified by the base user data reference information is compared with the derived user data, and for data included in the derived user data, the data included in the derived user data is used, and for data that is not included in the derived user data and is included only in the user data specified by the base user data reference information, the data included in the user data to be referred to is used.

4. The system design support apparatus according to claim 2, further comprising:
   a write circuitry configured to write the newuser data to a device managed via a communication line.

5. The system design support apparatus according to claim 1, wherein a relationship between the user data specified by the base user data reference information and the derived user data is capable of being visually represented to allow editing of data while confirming whether user data currently edited is the base user data or the derived user data.

6. The system design support apparatus according to claim 1 wherein:
   the item in which the user data specified by the base user data reference information is used as is, and the item in which the user data specified by the base user data reference information is changed in the derived user data are displayed simultaneously.

7. The system design support apparatus according to claim 1, wherein the item in which the user data specified by the base user data reference information is used as is, and the item in which the user data specified by the base user data reference information is changed in the derived user data are displayed by the display data generating circuitry using a different color or with a distinctive surrounding shape.

8. The system design support apparatus according to claim 1, wherein the inconsistent data checking circuitry checks for duplication of IP addresses or station numbers in a same network in the derived user data and the user data specified by the base user data reference information.

9. The system design support apparatus according to claim 1, wherein the inconsistent data checking circuitry displays a consistency result when the duplicate portions do not exist.

10. A system design support method to generate new user data, using user data on an existing device, the method comprising:
 selecting user data to be used;
 generating derived user data, the derived user data including:
  base user data reference information for specifying the selected user data to be used; and information on an item changed from the user data specified by the base user data reference information and on changed contents;
 generating the new user data on a basis of the derived user data; and
 checking presence or absence of inconsistent data between the derived user data and the user data specified by the base user data reference information,
 checking the presence or absence of the inconsistent data includes determining whether duplicate portions of the derived user data and the specified user data exist, and displaying an inconsistency-error result when the duplicate portions exist, and wherein the system design support method further comprises generating display data for grouping and hierarchically displaying data included in the derived user data, and wherein in the hierarchical display of the data, an item in which the user data specified by the base user data reference information is used as it is, and an item in which the user data specified by the base user data reference information is changed in the derived user data are visually distinctively displayed.

11. The system design support method according to claim 10, wherein generating the new user data includes combining the user data specified by the base user data reference information and the derived user data.

12. The system design support method according to claim 11, wherein, the user data specified by the base user data reference information is compared with the derived user data, and for data included in the derived user data, the data included in the derived user data is used, and for data that is not included in the derived user data and is included only in the user data specified by the base user data reference information, the data included in the user data specified by the base user data reference information is used.

13. The system design support method according to claim 11, further comprising a step of writing the new user data to a device managed.

\* \* \* \* \*